(12) United States Patent
Bishop et al.

(10) Patent No.: US 8,068,556 B2
(45) Date of Patent: Nov. 29, 2011

(54) FLEXIBLE, RECONFIGURABLE, POWER EFFICIENT TRANSMITTER AND METHOD

(75) Inventors: James W. Bishop, Ellicott City, MD (US); Nazrul H. Mohd Zaki, Columbia, MD (US); David Childress Newman, Salisbury, MD (US); Steven N. Bundick, Pocomoke City, MD (US)

(73) Assignee: LJT & Associates, Inc., Columbia, MD (US)

( * ) Notice: Subject to any disclaimer, the term of this patent is extended or adjusted under 35 U.S.C. 154(b) by 795 days.

(21) Appl. No.: 12/147,100

(22) Filed: Jun. 26, 2008

(65) Prior Publication Data

US 2009/0323854 A1    Dec. 31, 2009

(51) Int. Cl.
*H04L 27/00*   (2006.01)

(52) U.S. Cl. ........ 375/295; 375/219; 375/135; 375/146; 375/297; 455/127.1; 455/126

(58) Field of Classification Search .................. 375/295
See application file for complete search history.

(56) References Cited

U.S. PATENT DOCUMENTS

| | | | | |
|---|---|---|---|---|
| 3,585,517 A | * | 6/1971 | Herbert | 330/10 |
| 6,032,028 A | * | 2/2000 | Dickey et al. | 455/110 |
| 6,040,728 A | * | 3/2000 | Nelson et al. | 327/292 |
| 6,625,227 B1 | * | 9/2003 | Shull et al. | 375/295 |
| 6,674,999 B2 | * | 1/2004 | Ramachandran | 455/115.1 |
| 2003/0003886 A1 | * | 1/2003 | Kato et al. | 455/127 |
| 2007/0275676 A1 | * | 11/2007 | Rofougaran et al. | 455/127.1 |

* cited by examiner

*Primary Examiner* — Shuwang Liu
*Assistant Examiner* — Lihong Yu
(74) *Attorney, Agent, or Firm* — Mel Barnes; Capital Legal Group, LLC

(57) ABSTRACT

A flexible, reconfigurable, power efficient transmitter device and method is provided. In one embodiment, the method includes receiving outbound data and determining a mode of operation. When operating in a first mode the method may include modulation mapping the outbound data according a modulation scheme to provide first modulation mapped digital data, converting the first modulation mapped digital data to an analog signal that comprises an intermediate frequency (IF) analog signal, upconverting the IF analog signal to produce a first modulated radio frequency (RF) signal based on a local oscillator signal, amplifying the first RF modulated signal to produce a first RF output signal, and outputting the first RF output signal via an isolator. In a second mode of operation method may include modulation mapping the outbound data according a modulation scheme to provide second modulation mapped digital data, converting the second modulation mapped digital data to a first digital baseband signal, conditioning the first digital baseband signal to provide a first analog baseband signal, modulating one or more carriers with the first analog baseband signal to produce a second modulated RF signal based on a local oscillator signal, amplifying the second RF modulated signal to produce a second RF output signal, and outputting the second RF output signal via the isolator. The digital baseband signal may comprise an in-phase (I) digital baseband signal and a quadrature (Q) baseband signal.

29 Claims, 2 Drawing Sheets

FLEXIBLE, RECONFIGURABLE, POWER EFFICIENT TRANSMITTER AND METHOD

ORIGIN OF THE INVENTION

The invention described herein was made in the performance of work under a NASA contract and by an employee of the United States Government and may be manufactured and used by or for the Government of the United States of America for governmental purposes without the payment of any royalties thereon or therefor.

FIELD OF THE INVENTION

The present invention generally relates to communication transmitters and more particularly, to a flexible, small, lightweight, efficient, high power transmitter such as for use as flight hardware.

BACKGROUND OF THE INVENTION

Designers have many considerations when designing transmitters. For example, while transmission power is often one requirement, transmitters that comprise flight hardware (equipment used on rockets, satellites, airplanes, jets, etc.) often have many other stringent requirements. For example, flight hardware often has size (volume), weight, and power efficiency (or power input) constraints (in addition to a power output constraint).

In addition, it may also be desirable (and in some instances required) for the transmitter to be highly configurable and flexible so that it can communicate using a wide array of communication protocols and modulation schemes. In addition, to have commercial feasibility the design must be cost efficient and in some instances use commercial off-the-shelf (COTS) components.

Transmitters for launch vehicles used to communicate through NASA's Tracking and Data Relay Satellite System (TDRSS) may have all these constraints. However, those skilled in the art will recognize that many of these requirements impose constraints that are at odds with others of these requirements. Consequently, there is a need for a light weight, small, power efficient, flexible, easily reconfigurable, high speed, transmitter that is cost efficient.

Some embodiments of the present invention provide a light weight, small, power efficient, flexible, easily reconfigurable, high speed, transmitter that is cost efficient.

SUMMARY OF THE INVENTION

The present invention provides a flexible, reconfigurable, power efficient transmitter device and method. In one embodiment, the method includes receiving outbound data and determining a mode of operation. When operating in a first mode the method may include modulation mapping the outbound data according a modulation scheme to provide first modulation mapped digital data, converting the first modulation mapped digital data to an analog signal that comprises an intermediate frequency (IF) analog signal, upconverting the IF analog signal to produce a first modulated radio frequency (RF) signal based on a local oscillator signal, amplifying the first RF modulated signal to produce a first RF output signal, and outputting the first RF output signal via an isolator. In a second mode of operation method may include modulation mapping the outbound data according a modulation scheme to provide second modulation mapped digital data, converting the second modulation mapped digital data to a first digital baseband signal, conditioning the first digital baseband signal to provide a first analog baseband signal, modulating one or more carriers with the first analog baseband signal to produce a second modulated RF signal based on a local oscillator signal, amplifying the second RF modulated signal to produce a second RF output signal, and outputting the second RF output signal via the isolator. In a third mode of operation, the method may include modulation mapping the outbound data according a modulation scheme to provide a second digital baseband signal, conditioning the second digital baseband signal by reducing the amplitude of the second digital baseband signal to provide a second analog baseband signal, modulating one or more carriers with the second analog baseband signal to produce a third modulated RF signal based on the tuned local oscillator signal, amplifying the third RF modulated signal to produce a third RF output signal; and outputting the third RF output signal via the isolator. The first and second digital baseband signal may each comprise an in-phase (I) digital baseband signal and a quadrature (Q) baseband signal TBD

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, circuitry, techniques, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, circuitry, techniques, data and network protocols, software products and systems, operating systems, development interfaces, and hardware are omitted so as not to obscure the description.

The present invention employs digital signal modulation methods and analog and digital circuitry to implement a radio frequency transmitter. In comparison to many prior art transmitters, the transmitter of the present invention is smaller, more power efficient, more flexible, and more easily configurable. In many embodiments, the invention may employ commercial of the shelf components for reduced manufacturing and development costs.

Figure 1:
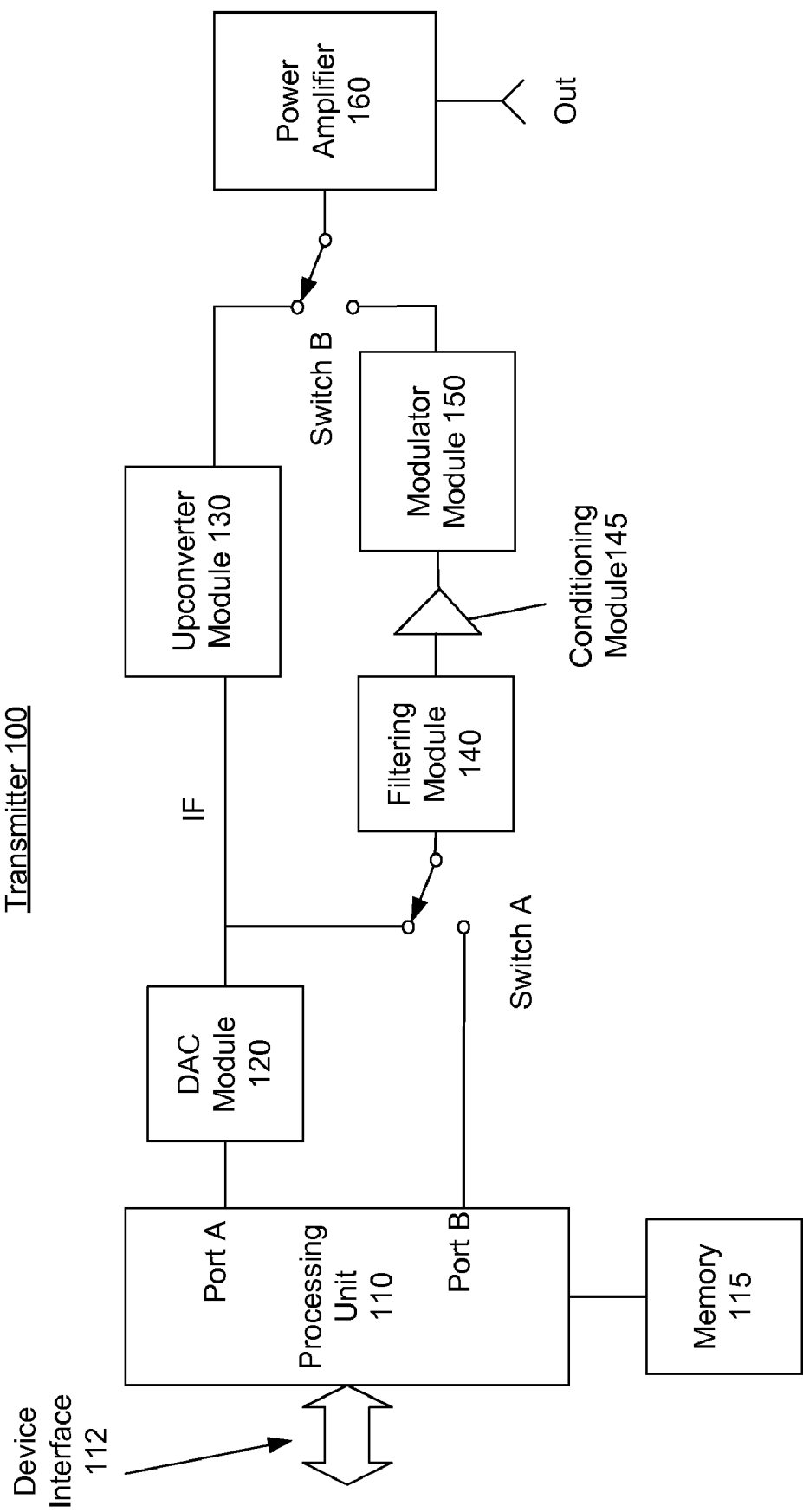
FIG. 1 is a block diagram of transmitter in accordance with an example embodiment of the present invention.

FIG. 1 provides a functional block diagram of a transmitter 100 in accordance with an example embodiment of the present invention. The transmitter 100 includes a processing device 110, a memory 115, a digital-to-analog converter (DAC) module 120, an upconverter module 130, switches A and B, filtering module 140, modulator module 130, conditioning module 145, and power amplifier 160. In other embodiments, the functions performed by these components may be performed by fewer or more components.

The processing unit 110 may comprise one or more of a microprocessor, micro-controller, digital signal processor, microcomputer, central processing unit, field programmable gate array, programmable logic device, state machine, logic circuitry, analog circuitry, digital circuitry, and/or any device that manipulates digital data based on operational instructions. The memory 115 may include one or more devices and comprise read-only memory, random access memory, volatile memory, non-volatile memory, static memory, dynamic memory, flash memory, and/or any device that stores digital information. In addition, a portion of memory 115 may be integrated with the processing unit 110. The memory 115 stores the executable program code, operational parameters, and other data for operating the processing unit 110.

The processing unit 110 receives digital data and commands via its device interface 112 from a host device (e.g., an onboard computer system of the flight vehicle). Based on commands from the host device and/or execution of program code stored in memory 115, the processing unit 110 provides modulation mapping of the data according to the selected modulation scheme, and outputs the data in one of three methods and via one of three data paths as will be discussed in more detail below. To that end, processing device 110 may control operation of switches A and B to control the flow of signals to the power amplifier 160. In addition, the processing unit 110 may provide digital filtering, encoding, modulation mapping (of outbound digital data to a constellation symbol in accordance with the selected modulation scheme), and/or other digital processing.

The DAC module 120 may comprise one or more DAC integrated circuits. The DAC module 120 receives digital data from the processing unit 110 and may output an analog signal at an intermediate frequency or a digital baseband signals.

The upconverter module 130 receives the analog signal, which as discussed be at an intermediate frequency (IF), from the DAC module 120 and upconverts (e.g., frequency translates) the IF analog signal to a transmission frequency, which may comprise an S band signal between 2 and 4 GHz.

Filter module 140 filters incoming digital baseband signals, which may comprise low voltage TTL signals from the DAC module 120 or from Port B of the processing unit. Conditioning module 145 receives the filtered digital baseband signals and conditions the signals to provide an analog baseband signal.

Modulator module 150 receives the analog baseband signals and uses the signals to directly modulate one or more carriers signals. In one embodiment, the analog based band signal is modulated via quadrature phase shift key modulation.

Depending on the setting of switch B, power amplifier 160 receives the modulated RF signal from either the upconverter module 130 or the modulator module 150. The power amplifier 16 amplifies the received modulated RF signal for output via an antenna (not shown). While not depicted in the block diagram of FIG. 1, upconverter module 130 and the modulator module 150 may include, or receive an input from, a local oscillator that outputs a sine wave signal whose frequency is based on a control signal from the processing unit 110.

As discussed, the data may traverse any of three data paths from the processing unit 110 to the power amplifier 160. When traveling a first data path, the data is output as digital data from Port A of the processing unit 110 and converted to an analog signal by the DAC module 120, which is at the intermediate frequency. The IF signal is upconverted by the upconverter module 130, and amplified and output by the power amplifier 160.

When traveling a second data path, the data is output as digital data from Port A of the processing unit 110 and converted to a digital baseband signal by the DAC module 120, such as, for example, at low voltage TTL levels. The digital baseband signal is provided to filtering module 140 via switch A to be filtered (if necessary) and then provided to a conditioning module 145, that conditions the received digital signal to provide an analog baseband signal. The modulator module 150 modulates the analog baseband signal and outputs the modulated RF signal to be amplified and output by the power amplifier 160.

When traveling a third data path, the data is output as digital data from Port B of the processing unit 110 as a digital baseband signal and supplied to filter module 140 via switch A. The digital baseband signal is filtered and provided to the conditioning module 145, which conditions the received digital signal to provide an analog baseband signal. The analog baseband signal is provided to the modulator module 150 for modulation in, for example, the S Band. The modulated signal is then amplified and output by the power amplifier 160.

Thus, this embodiment of the present invention includes three modes of operation of the processing unit 110 and three pathways over which outbound signals may be conducted. These three modes of operation (and data signal flow) allow for use of the transmitter in various scenarios, at high and lower data rates, and at various frequencies.

Figure 2:
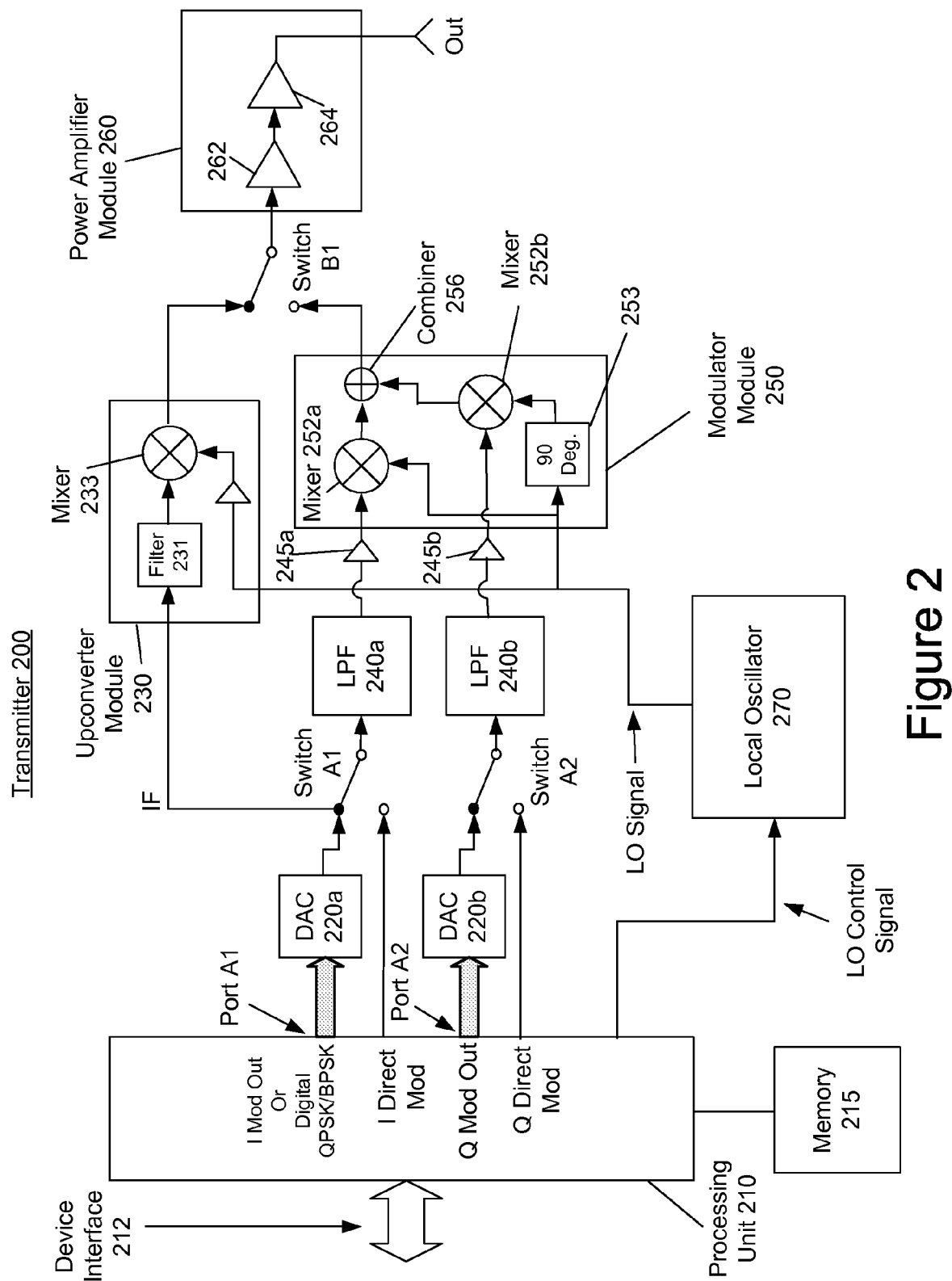
FIG. 2 is a block diagram of transmitter, in accordance with an example embodiment of the present invention.

FIG. 2 illustrates a block diagram of an example embodiment of a transmitter according to the present invention. Similar to the embodiment of FIG. 1, the main elements of this example embodiment include a low power processing unit 210, a DAC module (comprised of a pair of low power high speed digital-to-analog converters 220), a low power RF modulator module 250, a conditioning module (comprised of conditioners 245), a low power upconverter module 230, an RF power amplifier module 260, and a filtering module (comprised of low pass filers 240a,b). Using low power components allows for a small form factor. In addition, much (and in some embodiments, most) of the power management effort may be concentrated on the most power intensive component, which in this embodiment is the RF high power amplifier module 260. In other words, the device may comprise a very power efficient transmitter with a high percentage of the power consumed by the transmitter being consumed by the power amplifier module 260 to transmit the RF modulated signals. In one embodiment, the overall efficiency of the transmitter is over 30%.

During operation of this example embodiment, the transmitter 200 receives outbound data (data to be transmitted) from the host device via the device interface 212. The device interface 212 may include one or more ports collectively configured to receive Low Voltage Differential Signals (LVDS), Low Voltage Transistor-transistor Logic (LVTTL) signals, Positive Emitter-coupled Logic (PECL), RS-422 signals, and Current Mode Log (CML) signals. Such an interface provides a great deal of flexibility and allows the transmitter to be used with a wide array of host devices. The transmitter 200 may also receive control messages and/or control data via the device interface 212 to allow the processing unit 210 to determine which mode to operate in, to determine the frequency (band) for transmission (to tune the LO 270), to determine the modulation scheme, to determine the communication protocol, and/or to determine various other communication parameters. Alternately, or in addition thereto, the communication parameters may be determined based on program code and data stored in memory 215.

The device interface 212 routes the outbound data to the processing unit 210, which the processes the outbound data in accordance with a particular transmission desired to produce digital data output such as, for example, a digital baseband signal or a digital IF signal.

In this example the processing unit 210 is formed of a Field Programmable Gate Arrays (FPGA) although in other embodiments it may be implemented with other devices. For example, suitable processors may include, for example purposes only, a general purpose processor, a special purpose processor, a digital signal processor (DSP), a plurality of microprocessors, one or more microprocessors in association with a DSP core, a controller, a microcontroller, Application Specific Integrated Circuits (ASICs), another type of integrated circuit (IC), and/or a state machine.

Using an FPGA as the processing unit 210 allows for a transmitter that is extremely reconfigurable. The reconfigurability of the FPGA provides a quick and easy adaptation to the various communication protocols, whilst the flexibility of the modulator module (discussed below) supports the generation of a wide range RF complex modulation schemes such as the QAM, QPSK, BPSK, PM, M-PSK, FM and FSK. Some embodiments of the present invention can support data transmission up to 500 Mbps using QPSK modulation scheme.

In this embodiment, the processing unit 210 is capable of processing the data in accordance with any of three modes of operation. Based on commands from the host device and/or program code store in memory 215, the processing unit 210 processes the output data and outputs the data via one of three modes to communicate the data signals along one of three pathways by controlling the operation of switches A1, A2, and B1.

The processing unit 210 of this example includes a modulation mapping module (not illustrated separately). The modulation mapping module maps outbound digital data to a constellation symbol in accordance with the selected modulation scheme. The digital data may be modulated according to QPSK (Quadrature Phase Shift Keying), BPSK (Binary Phase-Shift Keying), or other desired modulation method. In this example, the processing unit 110 maps the received output data to a constellation symbol in accordance with QPSK modulation, which includes an I component (in-phase component) and a Q component (quadrature phase component), which are combined as a single digital data output. In addition, the processing unit 210 may encode, format, and filter the digital data. The digital data is output to the DAC 220 from port A1. The DAC 220a converts the digital input to an analog signal, which in this embodiment is at an intermediate frequency (IF) such as, for example, at 70 Megahertz.

The IF analog signal is provided to an upconverter module 230 that may include a filter 231 (e.g., a SAW (Surface Acoustic Wave) filter). The output of the filter 231 is provided to a mixer 233 that mixes the filtered IF analog signal with a LO (Local Oscillator) signal to thereby upconvert the IF analog signal to the transmission frequency, such as, for example, at an S-band frequency.

The Local Oscillator 270 receives a control signal (analog or digital) from the processing unit 210 that controls the frequency of the LO signal to thereby determine the frequency of signals output by the upconverter module 230 (and modulator module 250). Thus, the LO 270 of this embodiment comprises a tunable LO.

The output of the mixer 233 of the upconverter module 230 is supplied to the power amplifier module 260 via switch B1 for amplification and transmission. While not shown, the processing unit 210 may be operatively coupled to the power amplifier module 260 to turn on and off the amplifier module 260 and to control the amount of amplification by power amplifier module 260. In one embodiment, the power amplifier module 260 (alone) may have an efficiency of greater than forty percent and be formed of the latest gallium-nitride (GaN) technology. In this embodiment, the power amplifier module 260 includes a driver 262 that receives the upconverted analog signal from Switch B1 and conducts the signal to an efficient high power amplifier 264. The processing unit 110 may be operatively connected to both the driver 262 and power amplifier 264 to turn either or both of the devices on or off. The output from the power amplifier 264 may be supplied to an antenna (not shown). In addition, some embodiments may include additional analog filtering just prior to, within, or after the power amplifier module 260. In some embodiments, the output of the power amplifier module 260 may be connected to an isolator (that is connected to an antenna). Such an isolator may be used to prevent the power amplifier 264 from burning out should its output be connected to a load that approaches an open or short circuit. In this embodiment, the output power of the transmitter may be fifty watts or more.

While this mode allows for significant flexibility in filtering, use of the IF frequency and subsequent upconverting may cause a significant amount of undesirable spurs and images.

In a second mode of operation, the processing unit 210 performs modulation mapping to map the outbound digital data to the constellation in accordance with selected modulation scheme, which includes an I component and a Q component (again using QPSK modulation). The processing unit 210 also may encode, format, and filter the digital data, which may occur before the modulation mapping or after the modulation mapping in this mode and the other modes. In this embodiment, the processing unit 210 performs pre-modulation filtering such as, for example, digitally performing a finite impulse response (FIR) filtering. The processing unit outputs the I component from Port A1 and the Q component from Port A2. The digital I component from Port A1 is provided to DAC 220a and the digital Q component from Port A2 is provided DAC 220b. DACs 220a and 220b convert the received digital signals to LVTTL (low voltage TTL) digital baseband signals that are provided to switch A1 and switch A2, respectively. Those skilled in the art recognize that a digital-to-analog converter (DAC) functions to output an analog signal based on a digital input. Thus, in this embodiment the input to the DACs 220 comprise digital data that causes the DACs to output a signals that comprises a LVTTL digital signal (e.g., one and zeros at LVTTL voltage levels) referred to herein as a digital baseband signal. In addition, the pre-modulation filtering by the processing unit 210 causes the DACs 220 to produce digital baseband signals at LVTTL levels having somewhat more rounded or smoothed corners (more so than conventional LVTTL signals) to improve the spectral performance of the modulator module 250.

The digital baseband output of DAC 220a and 220b traverses through switches A1 and A2 to low pass filters (LPFs) 240a and 240b, respectively. Filters 240a and 240b filter the unwanted (e.g., higher) frequencies and conduct the LVTTL signals to conditioners 245a and 245b, respectively. Depending on the amount and type of pre-modulation filtering performed by processing unit 210, filters 240 may not perform any filtering on the digital baseband signals and, therefore, in some embodiments, such filters may not be necessary.

In this embodiment the digital baseband signals comprise LVTTL signals. Generally, TTL (Transistor-transistor Logic) devices operate based on a five volt logic system. Low voltage TTL operates based on a 3.3 volt logic system (sometimes slightly higher). So for LVTTL signals, a signal is defined as "low" when between 0 volts and 0.8 volts with respect to a ground terminal, and defined as a "high" when between 2.2 volts and 3.3 volts (V). This example embodiment of the present invention supplies signals having much lower voltage levels to the modulator module 250. For example, the analog baseband signals output by the conditioners 245*a,b* may comprise signals in the range of 0 to 1 volts, more preferably 0 to 600 mV (millivolts),—referred to herein as conditioned TTL signals. The conditioners 245 also may act as a driver and provide impedance matching to the input of the modulator module 250.

As discussed, TTL devices are operated between voltage levels of zero and a much higher voltage (e.g., 5 volts). These higher voltages often saturate the associated modulator and other circuitry of the device. The repeated saturation of the modulator and other circuitry during communications may cause undesirable noise that interferes with the reception or transmission of data. In order to overcome this problem, the present invention supplies data to the modulator module 250 using conditioned TTL signals, which do not saturate the modulator module 250 and result in the described interference.

Thus, the LVTTL digital baseband signals are provided to conditioners 245, which condition the LVTTL digital baseband signals to provide analog baseband signals (e.g., less than one volt peak to peak). In one embodiment, each conditioner 245 may comprise an operational amplifier that (among other conditioning processes) may reduce the amplitude of the incoming digital baseband signals. The analog baseband signals are output by the conditioners 245*a,b* and provided to mixers 252*a* and 252*b*, respectively, of modulator module 250. In one embodiment, modulator module 250 may comprise an AD8349 modulator chip manufactured by Analog Devices.

Mixer 252*a* mixes the I component of the analog baseband signal with the LO signal from the local oscillator 270 to thereby modulate analog baseband signal onto the carrier. Mixer 252*b* receives the LO signal via phase shifter circuit 253 that delays the LO signal by ninety degrees of one period. The mixer 252*b* mixes the Q component of the analog baseband signal with the delayed LO signal to thereby modulate the analog baseband signal onto the carrier. In one embodiment, the modulator module 250 includes a diode bridge to function as each mixer 252.

The output of mixers 252*a* and 252*b* are supplied to combiner 256, which combines the two modulated signals and outputs the modulated RF signal through switch B1 to power amplifier module 260 for amplification and transmission as described above. This mode of operation allow for some pre-modulated filtering such as, for example, to reduce side band signals.

In a third mode of operation, the processing unit 210 performs digital signal perform encoding, modulation mapping, formatting and filtering of the received outbound data and outputs the I component from a first port (labeled I Direct Mod) and a Q component from a second port (labeled Q Direct Mod), again using QPSK. The outputs from the processing unit in this mode may again be LVTTL signals. The digital I component is provided to Switch A1 and the digital Q component is provided to Switch A2, which conduct the signals to low pass filters 240*a* and 240*b*, respectively. Filters 240*a* and 240*b* filter the unwanted (e.g., higher) frequencies. The low pass filters 240 will tend to round the corners (e.g., reduce the slope) of the digital baseband signals to improve the performance of the modulator module 250. The filtered digital baseband signals are conducted to conditioners 245, which may reduce the amplitude of the digital baseband signals (e.g., to 0 to 600 mV) and provide other conditioning to thereby output an analog baseband signal. The analog baseband signals are subsequently to mixers 252*a* and 252*b*, respectively, of modulator module 250.

Mixer 252*a* mixes the I component of the analog baseband signal with the LO signal from the local oscillator 270 to thereby modulate the baseband signal. Mixer 252*b* receives the LO signal via phase shifter circuit 253 that delays the LO signal by ninety degrees of one period. The mixer 252*b* mixes the Q component of the analog baseband signal with the delayed LO signal from the local oscillator 270 to thereby modulate the baseband signal.

The output of mixers 252*a* and 252*b* are supplied to combiner 256, which combines the two modulated signals and outputs the modulated RF signal through switch B1 to power amplifier module 260 for amplification and transmission as described above.

In another embodiment, a transmitter of the present invention may also operate in yet another mode of operation in which conditioners 245 provide a one to one amplification (no amplification) and act only as a driver and provide impedance matching to the input of the modulator module 250. In this mode, the processing unit 210 supplies digital data to the DACs 220*a,b* so that the output voltage levels of the DACs 220*a,b* are in the range of 0 to 600 mVolts (instead of LVTTL voltage levels).

In addition, in any of the embodiments the memory 215 may include a look up table stored therein that correlates temperature with power output (DAC outputs) and that is accessed by the processing unit 210. The processing unit 210 may receive temperature data from the power amplifier module 260 and adjust the output of the DACs 220*a,b* based on data retrieved from the table to ensure that the output of power amplifier module 260 remains constant. This feature may allow the power amplifier module 260 to provide constant power output over a wide range of temperatures.

In many embodiments, the low cost, small form factor and reconfigurable transmitter may be achieved by using state of the art COTS RF devices for the analog front and back ends, and using a Field Programmable Gate Arrays (FPGA) as the processing unit.

Various embodiments of the present invention may be suitable as a transmitter for use in launch vehicles to communicate through NASA's Tracking and Data Relay Satellite System (TDRSS) after the vehicle has gone over the horizon from the launch site. However, embodiments of the present invention also may be suitable for a wide array of other application.

The features, components and elements of the examples of present invention may be replaced with other features, components, and elements, and in some embodiments, may be omitted. The methods and flow charts provided in the present invention may be implemented in a computer program, software, or firmware tangibly embodied in a computer-readable storage medium for execution by a general purpose computer or a processor. Examples of a computer-readable storage medium include, but are not limited to, a read only memory (ROM), a random access memory (RAM), a register, cache memory, magnetic media such as internal hard disks and removable disks, magneto-optical media, and optical media such as CD-ROM disks, and digital video disks (DVDs).

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A transmitter, comprising:
   a processing module including memory and configured to receive outbound digital data and to modulation map received outbound digital data in accordance with a modulation scheme to provide modulation mapped digital data;
   a digital-to-analog converter (DAC) module configured to receive the modulation mapped digital data and to convert the modulation mapped digital data to one of a digital baseband signal and an intermediate frequency (IF) analog signal;
   a local oscillator configured to output a local oscillator (LO) signal;
   an upconverter module configured to receive the IF analog signal and to mix the IF analog signal with the LO signal to produce a first modulated radio frequency (RF) signal;
   a conditioner module configured to receive the digital baseband signal and to condition the digital baseband signal by reducing the amplitude of the digital baseband signal to provide an analog baseband signal;
   a modulator module configured to receive the analog baseband signal and to modulate one or more carriers with the analog baseband signal to produce a second modulated RF signal;
   a power amplifier configured to receive one of the first modulated RF signal and the second RF modulated signal and to amplifier the received RF modulated signal to produce an RF output signal;
   an isolator configured to isolate said power amplifier while outputting the RF output signal;
   wherein said processing module is configured to operate in a plurality of modes comprising:
   a first mode wherein outbound signals traverse through said DAC module and said upconverter module to said power amplifier and without traversing through said modulator module; and
   a second mode wherein outbound signals traverse through said DAC module and said modulator module to said power amplifier and without traversing through said upconverter module.

2. The transmitter according to claim 1, wherein said processing module is configured to operate in a third mode wherein outbound signals traverse through said modulator module to said power amplifier and without traversing through said DAC module and without traversing through said upconverter module.

3. The transmitter according to claim 1, wherein said processing module is further configured to output a digital baseband signal to said conditioner to thereby bypass said DAC module.

4. The transmitter according to claim 1, further comprising a filter module configured to receive and filter the digital baseband signal and to provide the filtered digital based band signal to said conditioner module.

5. The transmitter according to claim 1, wherein the analog baseband signal has a voltage no greater than one volt peak to peak.

6. The transmitter according to claim 1, wherein said power amplifier has a power efficiency that is at least forty percent.

7. The transmitter according to claim 1, wherein the digital baseband signal comprises an in-phase (I) digital baseband signal and a quadrature (Q) digital baseband signal.

8. The transmitter according to claim 7, wherein said conditioner module comprises:
   a first conditioner configured to condition the in-phase digital baseband signal to produce an in-phase analog baseband signal; and
   a second conditioner configured to condition the quadrature digital baseband signal to produce a quadrature analog baseband signal.

9. The transmitter according to claim 8, further comprising:
   a phase shift circuit configured to shift the LO signal by approximately ninety degrees to provide a phase shifted LO signal;
   wherein said modulation module includes a first mixer configured to mix the LO signal with one of the quadrature analog baseband signal and the in-phase analog baseband signal to produce a first modulated signal;
   wherein said modulation module includes a second mixer configured mix the phase shifted LO signal with the other of the quadrature analog baseband signal and the in-phase analog baseband signal to produce a second modulated signal; and
   a combiner module configured to combine the first modulated signal and the second modulated signal to produce the second modulated RF signal.

10. The transmitter according to claim 1, wherein said local oscillator is configured to receive a control signal and to output the local oscillator (LO) signal at a frequency that is dependent on the control signal.

11. A transmitter, comprising:
    a processing module including memory having program code stored therein, said processing module configured to modulation map data based one of a plurality of modulation schemes;
    said processing module configured to receive outbound digital data and to modulation map received outbound digital data in accordance one of the plurality of modulation schemes, to provide modulation mapped digital data;
    a digital-to-analog (DAC) module configured to receive the modulation mapped digital data and to output a signal that comprises one of a digital baseband signal and an IF analog signal;
    an upconverter module configured to receive the IF analog signal and to upconvert the IF analog signal to produce a first modulated radio frequency (RF) signal;
    a conditioner module configured to receive the digital baseband signal and to condition the digital baseband signal to provide an analog baseband signal;
    a modulator module configured to receive the analog baseband signal and to modulate one or more carriers with the analog baseband signal to produce a second modulated RF signal;
    a power amplifier configured to receive a RF modulated signal from either said upconverter or from said modulator module and to amplifier the received modulated signal to produce an RF output signal;

an isolator configured to isolate said power amplifier while outputting the RF output signal;
wherein said processing module is configured to operate in a plurality of modes comprising:
a first mode wherein outbound signals traverse through said DAC module and said upconverter module to said power amplifier and without traversing through said modulator module; and
a second mode wherein outbound signals traverse through said DAC module and said modulator module to said power amplifier and without traversing through said upconverter module.

12. The transmitter according to claim 11, wherein said processing module is configured to operate in a third mode wherein outbound signals traverse through said modulator module to said power amplifier and without traversing through said DAC module and without traversing through said upconverter module.

13. The transmitter according to claim 11, wherein said processing module is further configured to output a digital baseband signal to said conditioner to thereby bypass said DAC module.

14. The transmitter according to claim 11, further comprising a filter module configured to receive and filter the digital baseband signal and to provide the filtered digital based band signal to said conditioner module.

15. The transmitter according to claim 11, wherein the analog baseband signal has a voltage less than 600 millivolts.

16. The transmitter according to claim 11, wherein said power amplifier has a power efficiency that is at least forty percent.

17. The transmitter according to claim 11, wherein the digital baseband signal comprises an in-phase (I) digital baseband signal and a quadrature (Q) digital baseband signal.

18. The transmitter according to claim 17, wherein said conditioner module comprises:
a first conditioner configured to condition the in-phase digital baseband signal to produce an in-phase analog baseband signal; and
a second conditioner configured to condition the quadrature digital baseband signal to produce a quadrature analog baseband signal.

19. The transmitter according to claim 11, further comprising a local oscillator configured to receive a control signal from said processing module and to output a local oscillator (LO) signal at a frequency that is dependent on the control signal to said modulator module and said upconverter module.

20. A method of transmitting a communication signal, comprising:
receiving outbound data;
determining a mode of operation;
in a first mode of operation:
modulation mapping the outbound data according to a modulation scheme to provide first modulation mapped digital data;
converting the first modulation mapped digital data to an analog signal that comprises an IF analog signal;
upconverting the IF analog signal to produce a first modulated RF signal based on a local oscillator signal;
amplifying the first RF modulated signal to produce a first RF output signal; and
outputting the first RF output signal via an isolator;
in a second mode of operation:
modulation mapping the outbound data according to a modulation scheme to provide second modulation mapped digital data;
converting the second modulation mapped digital data to a first digital baseband signal;
conditioning the first digital baseband signal to provide a first analog baseband signal;
modulating one or more carriers with the first analog baseband signal to produce a second modulated RF signal based on a local oscillator signal;
amplifying the second RF modulated signal to produce a second RF output signal; and
outputting the second RF output signal via the isolator; and
in a third mode of operation:
modulation mapping the outbound data according to a modulation scheme to provide a second digital baseband signal;
conditioning the second digital baseband signal by reducing the amplitude of the second digital baseband signal to provide a second analog baseband signal;
modulating one or more carriers with the second analog baseband signal to produce a third modulated RF signal based on the tuned local oscillator signal;
amplifying the third RF modulated signal to produce a third RF output signal; and
outputting the third RF output signal via the isolator.

21. The method according to claim 20, wherein the first and second digital baseband signal each comprises an in-phase (I) digital baseband signal and a quadrature (Q) baseband signal.

22. The method according to claim 20, further comprising filtering the first digital baseband signal.

23. The method according to claim 20, wherein the first analog baseband signal has a voltage no greater than one volt peak to peak.

24. The method according to claim 20, wherein the first digital baseband signal comprises an in-phase (I) digital baseband signal and a quadrature (Q) digital baseband signal.

25. The method according to claim 24, wherein said conditioning comprises reducing the amplitude of the first digital baseband signal.

26. The method according to claim 20, further comprising tuning the a local oscillator signal to a selected frequency.

27. A method of transmitting communication signals, comprising:
receiving outbound data;
determining a mode of operation;
in a first mode of operation:
modulation mapping the outbound data according a modulation scheme to provide modulation mapped digital data;
converting the modulation mapped digital data to a first digital baseband signal;
wherein the first digital baseband signal comprises an in-phase (I) digital baseband signal and a quadrature (Q) digital baseband signal;
conditioning the first digital baseband signal by reducing the amplitude of the first digital baseband signal to provide an analog baseband signal;
modulating one or more carriers with the analog baseband signal to produce a first modulated RF signal based on a local oscillator signal;
amplifying the first RF modulated signal to produce a first RF output signal;
outputting the first RF output signal via an isolator; and
in a second mode of operation:
modulation mapping the outbound data according a modulation scheme to provide a second digital baseband signal;

conditioning the second digital baseband signal by reducing the amplitude of the second digital baseband signal to provide a second analog baseband signal;

modulating one or more carriers with the second analog baseband signal to produce a second modulated RF signal based on a local oscillator signal;

amplifying the second RF modulated signal to produce a second RF output signal; and outputting the second RF output signal via an isolator.

28. The method according to claim 27, wherein the second digital baseband signal comprises an in-phase (I) digital baseband signal and a quadrature (Q) digital baseband signal.

29. The method according to claim 27, wherein said conditioning the first digital baseband signal comprises:
conditioning the in-phase digital baseband signal to produce an in-phase analog baseband signal; and
conditioning the quadrature digital baseband signal to produce a quadrature analog baseband signal.

* * * * *

UNITED STATES PATENT AND TRADEMARK OFFICE
CERTIFICATE OF CORRECTION

PATENT NO.          : 8,068,556 B2                                  Page 1 of 1
APPLICATION NO.     : 12/147100
DATED               : November 29, 2011
INVENTOR(S)         : James W. Bishop It is certified that error appears in the above-identified patent and that said Letters Patent is hereby corrected as shown below:

Title Page, Item (57), in Abstract, in column 2, line 5, delete "according" and insert -- according to --, therefor.

Title Page, Item (57), in Abstract, in column 2, line 15, delete "according" and insert -- according to --, therefor.

In column 1, line 56, delete "according" and insert -- according to --, therefor.

In column 1, line 65, delete "according" and insert -- according to --, therefor.

In column 2, line 9, delete "according" and insert -- according to --, therefor.

In column 2, line 20, delete "TBD" and insert -- TBD. --, therefor.

In column 9, line 42, in Claim 1, delete "amplifier" and insert -- amplify --, therefor.

In column 10, line 1, in Claim 4, delete "based band" and insert -- baseband --, therefor.

In column 10, line 29, in Claim 9, delete "configured" and insert -- configured to --, therefor.

In column 10, line 66, in Claim 11, delete "amplifier" and insert -- amplify --, therefor.

In column 11, line 25, in Claim 14, delete "based band" and insert -- baseband --, therefor.

In column 12, line 41, in Claim 26, delete "the a" and insert -- a --, therefor.

In column 12, line 47, in Claim 27, delete "according" and insert -- according to --, therefor.

In column 12, line 65, in Claim 27, delete "according" and insert -- according to --, therefor.

Signed and Sealed this
Nineteenth Day of June, 2012

David J. Kappos
*Director of the United States Patent and Trademark Office*